(12) United States Patent
Yao et al.

(10) Patent No.: US 10,770,909 B2
(45) Date of Patent: Sep. 8, 2020

(54) SHORT CIRCUIT PROTECTION FOR DATA INTERFACE CHARGING

(71) Applicant: DIALOG SEMICONDUCTOR INC., Campbell, CA (US)

(72) Inventors: Jianming Yao, Campbell, CA (US); Yong Li, Campbell, CA (US); Dickson Wong, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 128 days.

(21) Appl. No.: 15/709,408

(22) Filed: Sep. 19, 2017

(65) Prior Publication Data

US 2018/0013300 A1    Jan. 11, 2018

Related U.S. Application Data

(63) Continuation of application No. PCT/US2015/067131, filed on Dec. 21, 2015.

(60) Provisional application No. 62/136,406, filed on Mar. 20, 2015.

(51) Int. Cl.
*H02J 7/00* (2006.01)
*H02M 3/335* (2006.01)
*H02H 7/122* (2006.01)
*H02J 7/04* (2006.01)

(52) U.S. Cl.
CPC ......... *H02J 7/0029* (2013.01); *H02H 7/1227* (2013.01); *H02J 7/0047* (2013.01); *H02J 7/04* (2013.01); *H02M 3/33523* (2013.01); *H02J 7/00* (2013.01); *H02M 3/33592* (2013.01); *Y02B 40/90* (2013.01); *Y02B 70/1475* (2013.01)

(58) Field of Classification Search
CPC ............ H02H 7/1227; H02J 2007/0062; H02J 7/0026; H02J 7/0027; H02J 7/1461; H02J 7/166; H02J 7/00302; H02J 7/00304; H02J 7/00306; H02J 7/00308; H02J 7/00309; H02M 3/33523; H02M 3/33592; Y02B 40/90; Y02B 70/1475
USPC ................................................. 320/134, 136
See application file for complete search history.

(56) References Cited

U.S. PATENT DOCUMENTS

| 9,805,890 | B2 * | 10/2017 | Doljack | H02J 9/005 |
| 2010/0073837 | A1 * | 3/2010 | Predtetchenski | G06F 13/4072 361/91.5 |
| 2011/0136381 | A1 * | 6/2011 | Cho | H01R 13/6641 439/620.01 |

(Continued)

FOREIGN PATENT DOCUMENTS

| CN | 101971488 A |  | 2/2011 |  |
| CN | 104037884 A |  | 9/2014 |  |
| CN | 104810877 A | * | 7/2015 | ............ H02J 7/0029 |

OTHER PUBLICATIONS

International Search Report and Written Opinion dated Mar. 29, 2016 in corresponding International Application No. PCT/US2015/067131 filed Dec. 21, 2015.

(Continued)

Primary Examiner — Richard Isla
Assistant Examiner — Michael N Dibenedetto
(74) Attorney, Agent, or Firm — Haynes and Boone, LLP

(57) ABSTRACT

A switching power converter is provided with an overvoltage protection circuit that monitors the differential data signal voltages in a data interface such as a USB data interface powering a load device to detect soft short conditions.

8 Claims, 4 Drawing Sheets

(56) References Cited

U.S. PATENT DOCUMENTS

| | | |
|---|---|---|
| 2011/0234172 A1 | 9/2011 | Kung |
| 2012/0200968 A1* | 8/2012 | Altemose .............. H02J 7/0026 |
| | | 361/86 |
| 2012/0212867 A1 | 8/2012 | Whitby-Strevents |
| 2013/0031398 A1 | 1/2013 | Srivastava et al. |
| 2014/0176048 A1* | 6/2014 | Uan-Zo-Li ........ H02M 3/33507 |
| | | 320/107 |
| 2014/0313792 A1 | 10/2014 | Satoru et al. |
| 2015/0326008 A1* | 11/2015 | Baurle et al. ........ H02H 1/0084 |
| | | 361/87 |
| 2016/0352132 A1* | 12/2016 | Zhang ................... H02J 7/0029 |

OTHER PUBLICATIONS

Anonymous, "High-Speed USB 2.0 DPST Switch with Overvoltage Protection (ovp) and Dedicated Charger Port Protection," Sep. 5, 2013, pp. 1-18, XP055258829, Retrieved from the Internet on Mar. 16, 2016: http://www.intersil.com/content/dam/Intersil/documents/is15/is154227.pdf.

Anonymous, "AN-6022 Using the FSUSB30/31 to Comply with USB 2.0 Fault Condition Requirements," May 12, 2006, pp. 1-3, XP055258835, Retrieved from the Internet on Mar. 16, 2016: https://www.fairchildsemi.com/application-notes/AN/AN-6022.pdf.

Chinese Office Action dated Nov. 19, 2018 in Chinese Patent Application No. 201580078025.6.

\* cited by examiner

SHORT CIRCUIT PROTECTION FOR DATA INTERFACE CHARGING

CROSS-REFERENCE TO RELATED APPLICATIONS

This application is a continuation of International Application No. PCT/US2015/067131 filed Dec. 21, 2015, which claims the benefit of U.S. Provisional Patent Application No. 62/136,406, filed Mar. 20, 2015, both of which are hereby incorporated by reference in their entirety.

TECHNICAL FIELD

This application relates to power converters, and more particularly to a protection circuit for a power converter charging a device through a data interface.

BACKGROUND

A flyback switching power converter is typically used to charge a mobile device as the converter's transformer provides safe isolation from AC household current. It is conventional for the switching power converter to couple to the device being charged through a standard interface such as a Universal Serial Bus (USB) interface. The USB interface includes a differential pair of signals (D+ and D−) for signaling and also provides power and ground. With regard to the delivery of power, a USB cable can only provide a certain amount of current. For example, the USB 2.0 standard allows for a maximum output current of 500 mA whereas the USB 3.0 standard allows a maximum output current of 900 mA. Traditionally, the delivery of power through a USB cable occurs using an output voltage of five volts. But modern mobile device batteries typically have a storage capacity of several thousand milliamps. The charging of such batteries, even at the increased output currents allowed in the USB 3.0 standard, would thus be delayed if the power is delivered using a five volt output voltage. This charging delay is exacerbated since the switching power supply, the USB cable, and the receiving device all present a resistance to the output current.

To enable a rapid charge mode in light of the output current limitations and associated losses from device resistances, it is conventional to use markedly higher output voltages over the USB cable. For example, rather than use the default USB output voltage of 5 V, rapid charging modes have been developed that use 9V, 12V, or even 19V. The increased voltages allow the switching power supply to deliver more power over the USB cable without exceeding the maximum output current limitations. However, many legacy devices can only accomodate the standard 5V from a USB cable. A rapid-charge switching power supply will thus engage in an enumeration process with the device being charged to determine if the higher output voltages are supported. This enumeration may occur over the differential D+ and D− pins in the USB interface. Through the enumeration, the switching power converter and the enumerated device may change the USB output voltage to an increased level that is supported by the enumerated device. The result is considerably reduced charging time, which leads to greater user satisfaction.

Although rapid charging modes are thus advantageous, problems have arisen with regard to their implementation. For example, the USB cable interface may get dirty such that a dust particle or other slightly conductive object couples between the VCC pin (the pin delivering the output voltage) and one of the differential signaling pins D+ and D−. Alternatively, the USB cable itself may become frayed from twisting by a user such that a slightly conductive path exists between the VCC wire and one of the wires for the D+ and D− signals. The result is a "soft short" between VCC and one of the differential data signals in the USB cable. It is denoted as a soft short in that the impedance for the coupling between the corresponding pins (or wires) is relatively high compared to a true short circuit. With regard to true short circuits, it is conventional for a switching power converter driving a USB cable to include an over-current protection circuit that will shut down the charging through the USB cable if a short circuit is detected. In this fashion, the maximum output current levels for the USB interface are not exceeded. But a soft short will not result in such a large increase in current. A conventional switching power converter with overcurrent protection will thus not respond to a soft short in that the increase in output current is negligible or minor such that it does not trigger an over-current state.

If the output voltage (VCC) is 5V such as was traditional for a USB interface, a soft short does not result in a dangerously elevated voltage level on the differential signaling pins as, by definition, a soft short involves a relatively high-impedance path. But as the output voltage is increased to support rapid charging, the differential signaling pin voltage may be driven to an unsafe level. For example, the receiving circuitry for the differential signaling in the device being charged may be harmed by the elevated differential signaling voltages.

Accordingly, there is a need in the art for improved power converters that protect against soft shorts over data interfaces.

SUMMARY

A power converter is provided that includes a voltage monitoring circuit for the differential data signals on a data interface such as a USB interface. The voltage monitoring circuit is configured to determine whether the voltages for the differential data signals have exceeded a maximum safe voltage threshold. In this fashion, the data interface is protected from excessive differential signaling voltages. These advantageous features may be better appreciated from the detailed description below.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
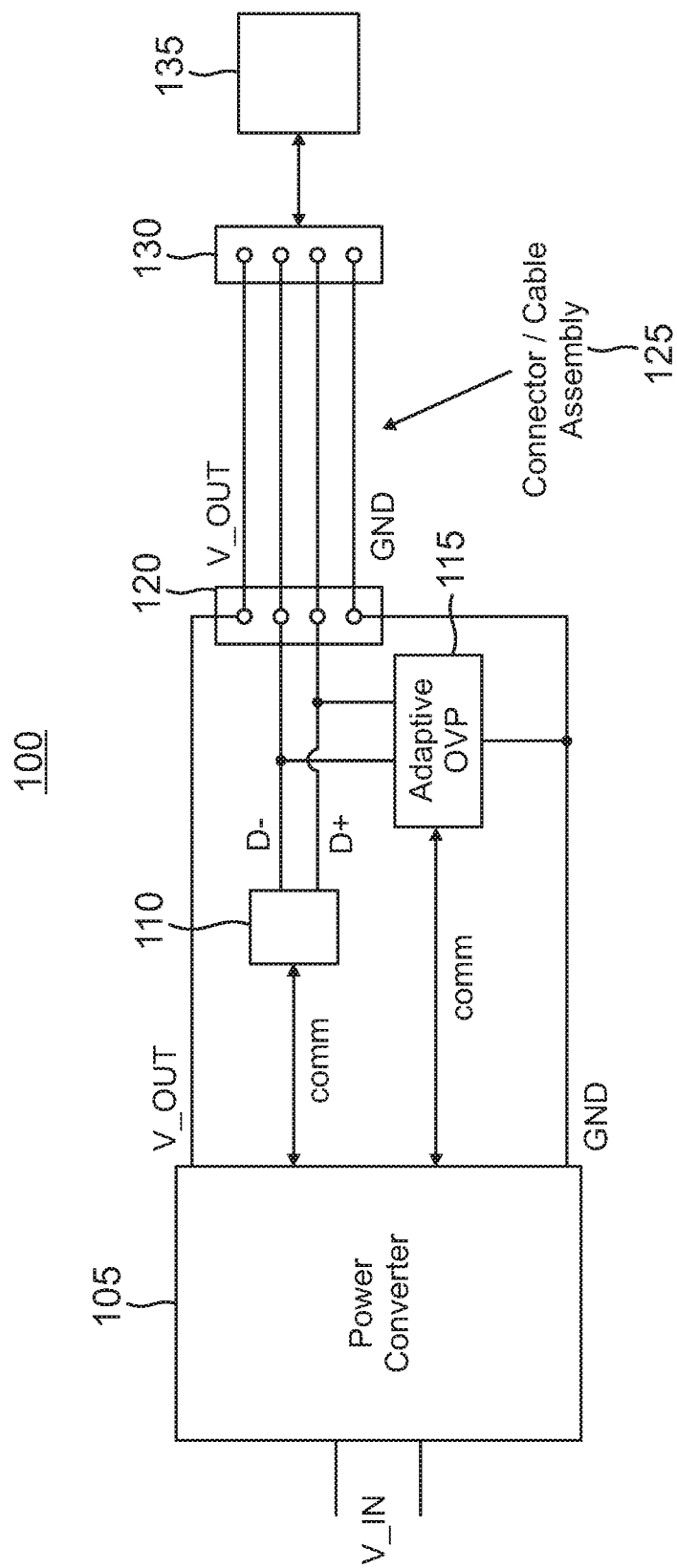
FIG. 1 is a block diagram of a switching power converter that powers a device through a USB interface in which a voltage monitoring circuit is provided that monitors the voltages of the differential data signals carried by the USB interface in accordance with an embodiment of the disclosure.

To address the need in the art for soft-short protection of data-cable-based power converters, a voltage monitoring circuit is provided that determines whether data signaling voltages on the cable have exceeded safe levels. The following discussion will assume that the cable interface is a Universal Serial Bus (USB) interface but it will be appreciated that any interface that combines power delivery with data signaling may be protected as discussed herein. An example system 100 is shown in FIG. 1. A power converter 105 may comprise a switching flyback converter or any other suitable power converter that converts power delivered by an input voltage V_IN into an output voltage V_OUT. Power converter 105 drives the output voltage V_OUT into the VCC pin or terminal of a USB interface 120. A USB cable 125 couples between USB interface 120 and a load USB interface 130 for a device 135 powered by power converter 105.

A rapid charge interface 110 for power converter 105 performs the enumeration with the device 135 with regard to increasing V_OUT above the conventional 5.0V level to one of the increased voltages supported by the USB 3.0 protocol. For example, power converter 105 may comprise a flyback converter in which a primary controller controls the switching of a power switch coupled to a primary winding of an inductor. In such an embodiment, the primary controller is isolated from USB interface 120 as USB interface 120 is located on the secondary winding side of the flyback converter's transformer. Rapid charge interface 110 would thus comprise a secondary controller coupled to the secondary winding in a flyback converter embodiment. For example, the enumeration by rapid charge interface 110 may indicate that load device 135 may support the receipt of V_OUT equaling 19V. Alternatively, other levels such as 9V or 12V may be supported. This enumeration is conventional for a fast charge mode of operation. To maintain the isolation between the primary and secondary windings in a flyback converter embodiment, rapid charge interface 110 would indirectly signal the resulting enumeration data to the primary controller such as through shorting a synchronous rectifier switch (not illustrated) that creates a primary winding voltage pulse detected by the primary controller. Alternatively, rapid charge interface 110 may communicate with the primary controller through an opto-coupler in a flyback embodiment. In a non-isolated converter such as a buck or a boost converter, rapid charge interface 110 may also function as the primary controller in regulating the switching of the power switch.

Rapid charge interface 110 communicates the enumerated voltage level to a primary controller (not illustrated) in power converter 105 as indicated by the "comm" signal flow between power converter 105 and rapid charge interface 110. Power converter 105 may then increase V_OUT from its default value of 5.0V to the negotiated increased level. Although only the D+ and D− signals are shown in system 100, it will be appreciated that the additional differential data signal pairs such as in the USB 3.1 protocol may also be used during enumeration.

With the power supply voltage V_OUT adjusted to its negotiated level, power converter 105 proceeds to power load device 135 through USB cable 125. But as discussed earlier, a soft short circuit may form between the VCC pin and the differential signaling pins in either of USB interfaces 130 and 120. Alternatively, USB cable 125 itself may be frayed such as from twisting such that a soft short circuit is developed within USB cable 125 itself. As used herein, a "soft short circuit" results from a relatively-high impedance path between the V_OUT power supply voltage lead or wire and the lead or wire for one of the differential data signals such as D+ or D wherein the impedance is such that the over-current protection circuit (not illustrated) associated with power converter 105 is not triggered. As a result of the soft short circuit, the voltage for the affected differential data signal may rise above a safe level. In general, it is conventional for a USB interface such as USB interfaces 120 and 130 to support differential data signal voltages up to the five volt default power supply voltage level. However, with the increased output voltages such as 9.0 V, 12.0 V, or 19.0 V, the affected differential signal voltage from a soft short circuit may readily reach an unsafe level that damages the interface circuitry in the enumeration circuit (not illustrated) within load device 135 or in rapid charge interface 110. Yet this dangerous differential signal voltage does not trigger an over-current protection mode of operation within power converter 105 because of the relatively high impedance for the path between the output voltage V_OUT and the affected differential voltage signal.

To detect whether a soft short circuit has triggered such a dangerous rise in the differential signaling voltage, an over-voltage protection (OVP) circuit 115 is provided that monitors the differential data signal voltages to determine whether these voltages have exceeded a safe level. Should OVP circuit 115 detect that an unsafe rise in voltage has occurred, it triggers power converter 105 to reduce the power supply voltage V_OUT to the default five volt level. In turn, fast charge interface 110 may re-enumerate load device 135 to indicate that the reduced power supply voltage will be used. As noted earlier, it is conventional for the differential data interface circuitry within load device 135 to be robust to the default five volt level for the output voltage V_OUT. Thus the soft short circuit becomes harmless.

In alternative embodiments, the detection of an unsafe differential data signal voltage may trigger a reset or some other default state in power converter 105 such that no power delivery is made. A user may then be alerted such as through an LED (not illustrated) that power delivery has been halted.

Figure 2:
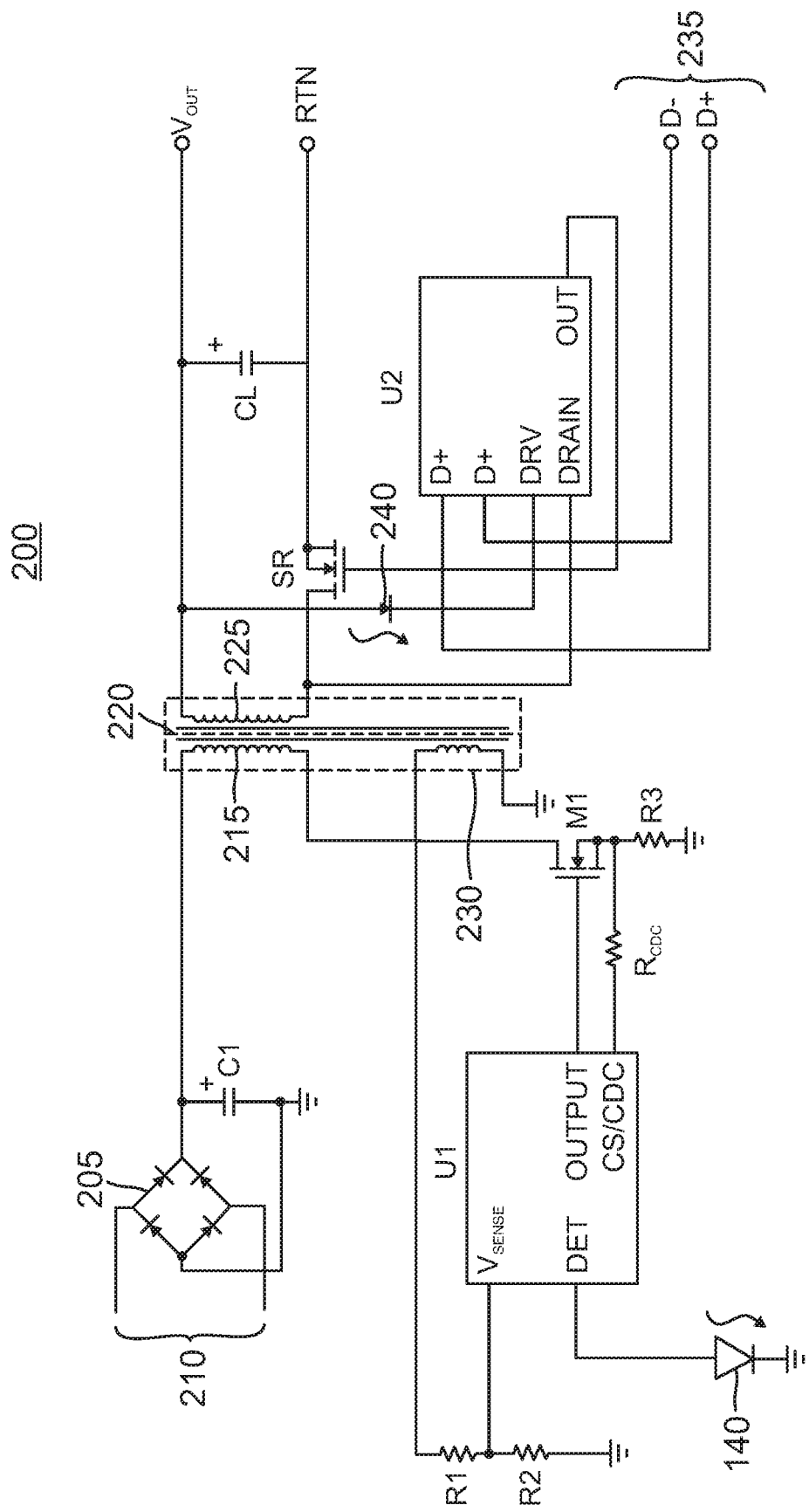
FIG. 2 is a circuit diagram of a flyback converter configured to monitor the voltages of the differential data signals in a USB interface to detect soft short conditions in accordance with an embodiment of the disclosure.

An example flyback converter 200 configured to monitor the differential data signal voltages to detect soft short conditions is shown in FIG. 2. A bridge rectifier 205 rectifies an AC input voltage from an AC mains 210 and outputs the resulting rectified input voltage into an input capacitor C1. This rectified input voltage drives a magnetizing current into a primary winding 215 of a transformer 220 when a power switch such as an NMOS power switch transistor M1 is driven on by a primary-side controller U1. The primary-side controller U1 modulates the cycling of the power switch M1 to regulate an output voltage $V_{OUT}$ produced at a secondary winding 225 of transformer 220. Since the primary-side controller U1 is isolated from a USB cable having a pair of a D+ and a D− data pins or terminals 235, a secondary-side controller U2 interfaces with the device being charged (not illustrated) through data pins 235. In flyback power converter 200, secondary-side controller U2 controls the cycling of a synchronous rectifier (SR) switch transistor such as an NMOS transistor. The secondary-side controller U2 switches on the SR switch transistor in response to primary-side controller U1 switching off the power switch M1. The resulting synchronous rectification is conventional and improves efficiency over the use of a diode on the secondary side to perform analogous synchronous rectification. It will be appreciated, however, that the advantageous soft-circuit detection techniques and systems disclosed herein may be practiced without synchronous rectification in which the SR switch transistor is replaced by a diode.

An auxiliary winding 230 for transformer 220 couples to ground through a voltage divider formed by a serial pair of resistors R1 and R2 to produce a sense voltage $V_{SENSE}$ that is received by primary-side controller U1. For example, primary-side controller U1 may sample $V_{SENSE}$ at the transformer reset time to sense the output voltage. To modulate the output voltage in response to this sensing, primary-side controller U1 may adjust the frequency or pulse width for the cycling of power switch transistor M1. For example, primary-side controller U1 may monitor the magnetizing current magnitude (CS) through a voltage divider formed by a resistor R3 and a cable drop compensation resistor ($R_{CDC}$) coupled to the source of power switch transistor M1. When the current magnitude CS reaches a desired level for a given power switching cycle, primary-side controller U1 may proceed to switch off power switch transistor M1.

Secondary-side controller U2 is configured to monitor the voltage on the D+ terminal in USB interface 135 to determine if a load such as a mobile device is attached to another end of the USB cable (not illustrated). In response to this detection, secondary-side controller U2 may enumerate the attached device to, for example, determine if the device supports a rapid-charge mode of operation in which the output voltage may be increased from a nominal default level such as 5 V to a higher level such as 12V or 19V. Secondary-side controller U2 may then signal the enumeration data to primary-side controller U1 by grounding an optocoupler 140 coupled to an anode of a load capacitor CL. A load capacitor CL couples between the output voltage node and ground (RTN) to smooth the output voltage. Primary controller U1 detects the voltage change across optocoupler 140 as a detect voltage (DET) to decode the enumeration data.

To control the cycling of the SR FET, secondary-side controller U2 monitors its drain voltage (DRAIN). While the power switch M1 is conducting, the drain voltage for the SR FET will be grounded or near zero but will then swing high when the power switch M1 is cycled off. As known in the synchronous rectification arts, secondary-side controller U2 responds to this voltage change by driving SR FET on through an OUT terminal. Due to the relatively-low on resistance of the SR FET, the resulting synchronous rectification saves power as compared to the use of a secondary-side diode.

A soft-short circuit may exist between the $V_{OUT}$ terminal and one of the differential signal terminals 235 To guard against this potentially unsafe condition, secondary-side controller U2 is configured to compare the differential data signal voltages to a safe threshold level such as 5V. If secondary-side controller U2 detects that the safe threshold voltage is exceeded, it signals primary-side controller U1 to reduce the output voltage VOUT to the default level in response to the detection of a soft short condition. The OVP circuit 115 of FIG. 1 is thus integrated with secondary-side controller U2 in flyback converter 200. Secondary-side controller U2 thus functions as both rapid charge interface 110 and OVP circuit 115 of FIG. 1.

Figure 3:
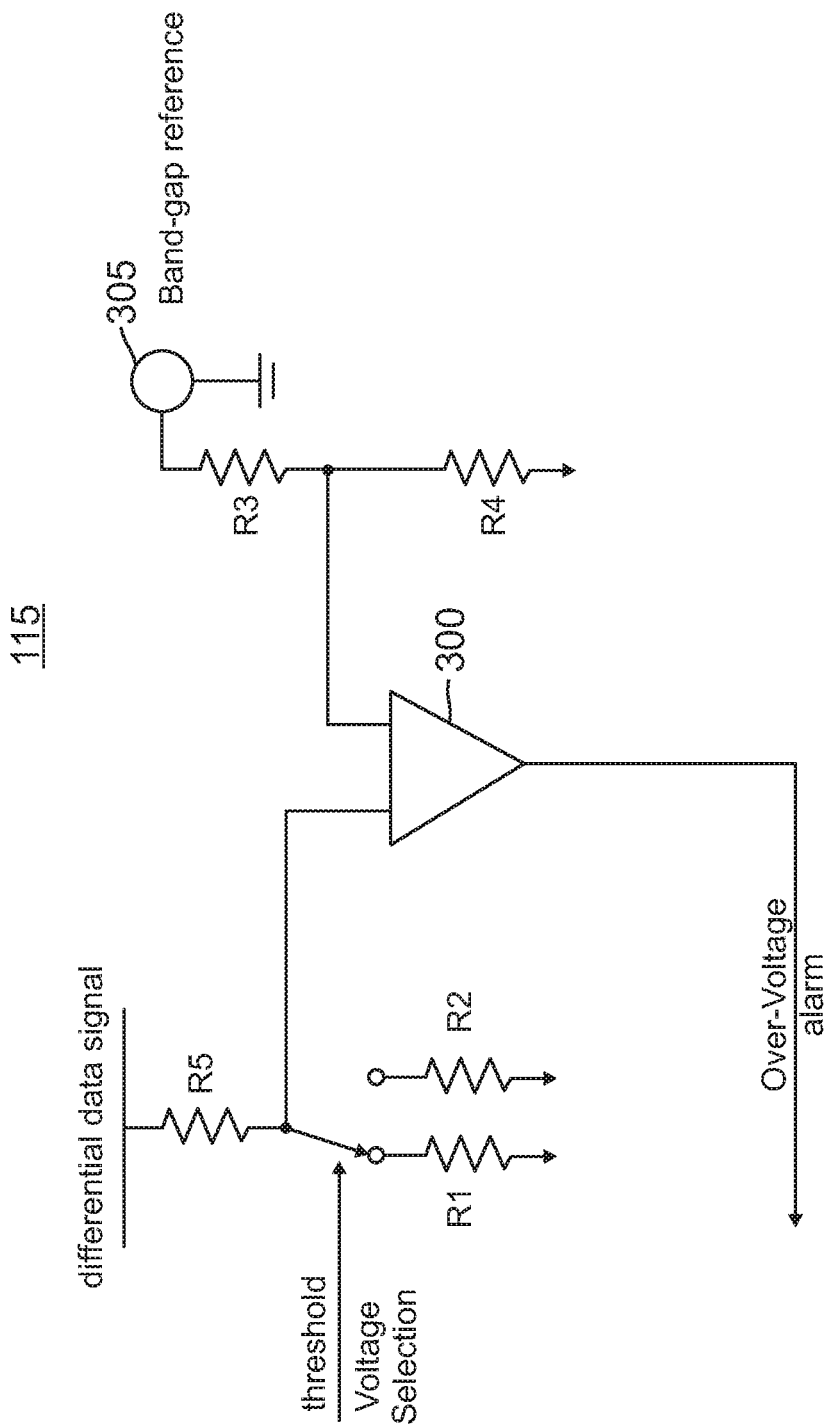
FIG. 3 is a circuit diagram of an over-voltage protection circuit for the systems of FIGS. 1 and 2.

FIG. 3 is a more-detailed circuit diagram of OVP circuit 115. For illustration clarity, only one monitored data signal is shown but it will be appreciated that the remaining data signals may be monitored analogously. A threshold voltage selection signal controls the selection of a resistor such as R1 or R2 in a voltage divider formed with resistor R5. During enumeration, rapid charge interface circuit 110 (FIG. 1) may determine the maximum safe level for the monitored data signal through communication with device 135. In alternative embodiments, a fixed voltage divider may be used such that the maximum safe level would be constant. A reference voltage source such as a bandgap circuit 305 or other suitable reference circuit generates a reference voltage that is divided in another voltage divider formed with resistors R3 and R4. In this fashion, a divided version of the data signal and the reference voltage may be compared in a comparator 300. The voltage dividers then determine what the maximum safe voltage will be. Should this level be exceeded, comparator 300 triggers an over-voltage alarm signal that is driven from rapid charge interface 110 to the primary controller in power converter 105 so that the V_OUT power supply level may be reduced to a safe level such as the conventional 5.0V level. Alternatively, a reset or other default condition may be triggered by the over-voltage alarm signal.

Figure 4:
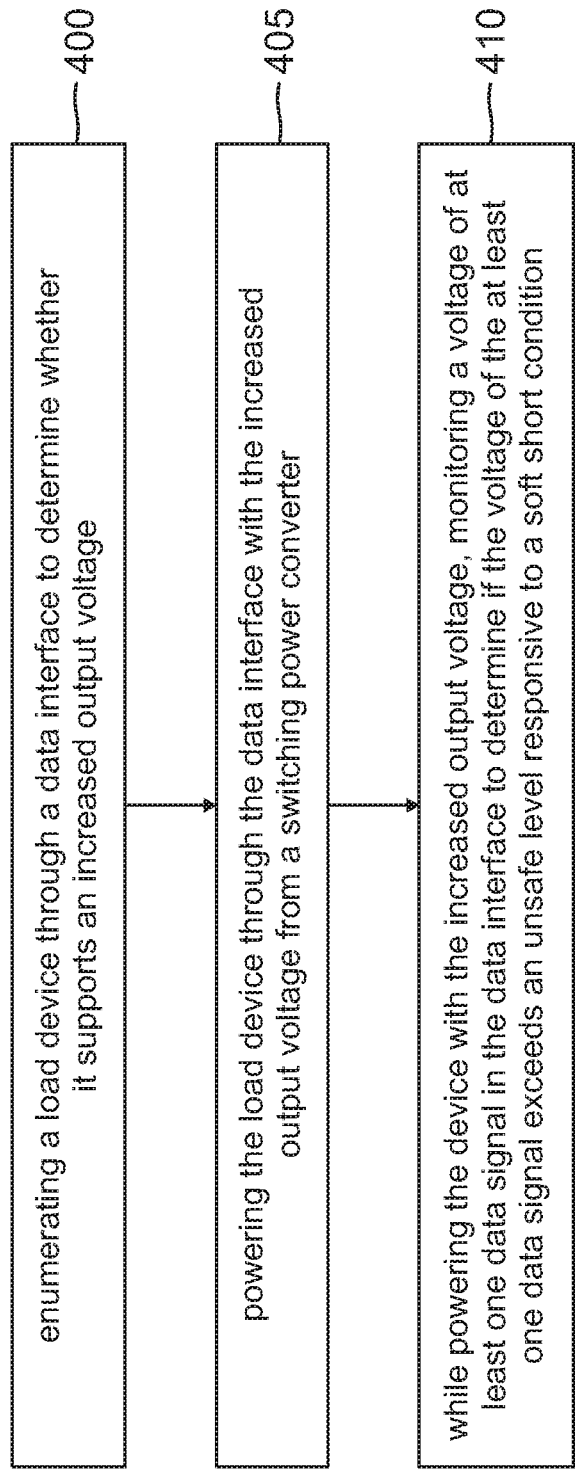
FIG. 4 is a flowchart for an example method of monitoring a USB interface to detect soft-short conditions.

An example method of monitoring a differential data signal for a data interface to detect soft short conditions will now be discussed with regard to the flowchart of FIG. 4. The method includes an act 400 of enumerating a load device through a data interface to determine whether it supports an increased output voltage. The enumeration of load device 135 by rapid charge interface 110 of FIG. 1 is an example of act 400. In addition, the method includes an act 405 of powering the load device through the data interface with the increased output voltage. The powering of the V_OUT terminal in USB interface 120 with an increased output voltage such as 9.0 V, 12.0 V, or 19.0 V is an example of act 405. Finally, the method includes an act 410 that occurs while powering the device with the increased power supply voltage and comprises monitoring a voltage of at least one data signal in the data interface to determine if the voltage of the at least one data signal exceeds an unsafe level responsive to a soft short condition. The determination by OVP circuit 115 that the differential data signal exceeds the default five volt level is an example of act 410.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:
1. A system, comprising:
a flyback converter including a transformer having a primary side and a second side, the flyback converter having a primary-side controller configured to regulate a switching of a primary-side power switch to power a load device through a power supply voltage carried on a power supply voltage pin in an USB data interface that includes a data signal carried on a pair of data pins separate from the power supply terminal;
a secondary-side fast charge interface configured to enumerate the load device using the data signal to determine whether the load device supports an increased output voltage level that is greater than a default level for the output voltage, and wherein the secondary-side fast charge interface is configured to signal the primary-side controller to increase the power supply voltage to the increased output voltage level; and a secondary-side overvoltage protection circuit including a comparator configured to compare a voltage for the data signal to a reference voltage to assert an overvoltage alarm signal to the primary-side controller responsive to the voltage for the data signal being greater than the reference voltage, wherein the primary-side controller is configured to reduce the power supply voltage to the default level responsive to an assertion of the overvoltage alarm signal.

2. The system of claim 1, wherein the data signal comprises at least one pair of differential data signals.

3. The system of claim 1, wherein the secondary-side overvoltage protection circuit further comprises a bandgap reference configured to provide the reference voltage to the comparator.

4. The system of claim 1, wherein the secondary-side overvoltage protection circuit further comprises a pair of voltage dividers, and wherein the comparator is configured to select the reference voltage from the pair of voltage dividers.

5. A method, comprising:
   enumerating a load device through a secondary-side fast charge interface of a flyback converter using a differential data signal carried on a pair of data pins to determine whether the load device supports an increased output voltage level for a power supply voltage supplied on a power supply voltage pin in a data interface for the flyback converter;
   in the flyback converter, increasing the power supply voltage from a default level to the increased output voltage level and powering the load device through the data interface with the power supply voltage at the increased output voltage level;
   while powering the load device with the power supply voltage at the increased output voltage level, comparing a voltage of the differential data signal to a reference voltage;
   asserting an overvoltage alarm signal responsive to the voltage of the differential data signal exceeding the reference voltage; and
   reducing the power supply voltage to the default level responsive to an assertion of the overvoltage alarm signal.

6. The method of claim 5, wherein the data interface is a USB interface.

7. The method of claim 6, further comprising dividing the voltage of the differential data signal through a voltage divider to produce a divided voltage, wherein comparing the voltage of the differential data signal comprises comparing the divided voltage.

8. The method of claim 6, wherein the reference voltage comprises a bandgap reference voltage.

* * * * *